(12) United States Patent
Hedquist

(10) Patent No.: US 8,866,344 B2
(45) Date of Patent: Oct. 21, 2014

(54) SYSTEM AND METHOD OF PARALLELING ENGINE-GENERATORS ON A COMMON BUS

(75) Inventor: Timothy Hedquist, Sugar Hill, GA (US)

(73) Assignee: Eaton Corporation, Cleveland, OH (US)

( * ) Notice: Subject to any disclaimer, the term of this patent is extended or adjusted under 35 U.S.C. 154(b) by 552 days.

(21) Appl. No.: 13/221,223

(22) Filed: Aug. 30, 2011

(65) Prior Publication Data

US 2013/0049479 A1     Feb. 28, 2013

(51) Int. Cl.
    *H02J 1/00*      (2006.01)

(52) U.S. Cl.
    USPC .......................................................... 307/87

(58) Field of Classification Search
    USPC .......................................................... 307/87
    See application file for complete search history.

(56) References Cited

U.S. PATENT DOCUMENTS

2002/0190526 A1 * 12/2002 Kern et al. .................. 290/40 B

OTHER PUBLICATIONS

Cummins Intellectual Property, Inc, "Glossary of Terms", http://cumminspower.com/en/technical/glossary/, 2011, 6 pp.
Steve Evans, "Case Study—Old School Synchronization", http://www.pennenergy.com/index/articles/pe-article-tools-template/_printArticle/articles/pennenergy/ugc/case-study/old-school-synchronization.html, 2011, 2 pp.
Thomson Technology Inc., "Automatic Synchronizing (Parallel Operation)", Engineering Brief, www.thomsontechnology.com, May 1996, 8 pp.
Caterpillar, "Control System Diesel and Gas Generator Sets", "Paralleling Control Panels for Diesel and Gas Generator Sets", www.cat-electricpower.com, 2010, 6 pp.
Kevin Benz, "Emergency and Fast Diesel Generator Set Starting", https://caterpillar.lithium.com/t5/BLOG-Power-Perspectives/Emergency-and-Fast-Diesel-Generator-Set-Starting/ba-p/6230, Apr. 29, 2011, 6 pp.
Basler Electric, "DECS-100 Digital Excitation Control Systems", www.basler.com, 2011, 8 pp.

* cited by examiner

*Primary Examiner* — Robert L. Deberadinis
(74) *Attorney, Agent, or Firm* — Eckert Seamans Cherin & Mellott, LLC; Kirk D. Houser

(57) ABSTRACT

A system parallels engine-generators on a common bus and includes circuit breakers and automatic voltage regulators. Each engine-generator includes an output having an alternating current voltage. Each breaker is between the output of a corresponding engine-generator and the bus. Each regulator includes a first mode controlling field excitation for a corresponding engine-generator and a second mode automatically controlling the AC voltage. A processor for the regulators starts the engine-generators, closes the breakers, causes the regulators to increase the field excitation for the corresponding engine-generator in the first mode as long as less than a predetermined current flows through a corresponding breaker until the field excitation is equal to a rated voltage, and responsively causes the regulators to automatically control the AC voltage of the output of the corresponding engine-generator in the second mode, and, otherwise, decreases the field excitation of the corresponding engine-generator in the first mode.

20 Claims, 3 Drawing Sheets

SYSTEM AND METHOD OF PARALLELING ENGINE-GENERATORS ON A COMMON BUS

BACKGROUND

1. Field

The disclosed concept pertains generally to engine-generators and, more particularly, to systems including a plurality of parallel engine-generators. The disclosed concept also pertains to methods of a paralleling a plurality of engine-generators.

2. Background Information

It is desirable to place two or more engine-generators in parallel with each other on a common electrical bus as quickly as possible. Success in this endeavor offers many advantages. Among these advantages is the fact that the National Fire Protection Agency (NFPA), in NFPA 110, Standards for Emergency and Standby Power Systems, and in NFPA 99, Standards for Health Care Facilities, impose a legal requirement for engine-generator (or gen-set) systems to provide emergency back-up power to certain equipment within 10 seconds.

With the time that it takes a gen-set to start and reach its rated voltage and frequency varying from about 5 to 7 seconds, it is believed to be virtually impossible to guarantee that multiple gen-sets can be closed to a common bus, such as an emergency bus, in less than 10 seconds when using conventional paralleling techniques.

A conventional "dead field paralleling" technique consists turning off gen-set excitation fields, closing multiple gen-set circuit breakers to a common bus, starting the gen-sets, and as they approach rated frequency (e.g., without limitation, 60 Hz) and rated voltage, turning on the gen-set excitation fields. When the excitation fields of these gen-sets are energized, electro-magnetic forces pull the gen-sets into parallel with each other. There are several distinct disadvantages to this technique. First, the mechanical forces and stresses exerted on the engines and generators subject to this type of dead field paralleling are relatively very large. Such forces and stresses can significantly reduce the effective life of the gen-sets or damage the generators and/or engines. Second, the relatively large currents that pass between gen-sets during this type of dead field paralleling can exceed the maximum acceptable gen-set current, thereby causing the gen-set circuit breakers to trip and rendering the gen-sets out of commission.

Automatic voltage regulators (AVRs) excite generator fields, thereby controlling the alternating current output voltage of a generator. When engine-generators (or gen-sets) are paralleled to a common bus and are out of phase, the voltage difference between the gen-sets causes current to flow between them. The magnitude of current is a function of AVR field excitation and how far out of phase the gen-sets are.

As shown in FIG. 1, the AVRs 2,4 fully excite the respective gen-sets 6,8. Here, in this example, the gen-sets 6,8 are 180 degrees out of phase. The magnitude of the current 11 flowing between the gen-sets 6,8 (and through the circuit breakers 10,12 and the common bus 14) causes mechanical stresses to the gen-sets 6,8 and sufficient current to trip the generator circuit breakers 10,12.

There are various other prior proposals to synchronize generators. In one approach, the generators are started, the circuit breakers are closed as the generators approach rated RPM (e.g., without limitation, typically 1800), and then the voltage regulators are turned on. However, in this approach, stresses to the engine and the generator are relatively very high and the current flowing between the generators may cause a generator circuit breaker trip.

For another prior proposal, the voltage regulators are turned off, the generators are started, and the circuit breakers are closed at crank terminate (e.g., when the engine starter motors are disengaged). If a generator is between 600 and 900 rpm, then the corresponding voltage regulator is turned on. If a generator does not reach crank terminate or does not meet the 600 to 900 rpm range, then it is temporarily locked out and the corresponding generator circuit breaker is opened, thereby allowing other generators to move to rated speed (e.g., without limitation, typically 1800 RPM). After the first generator closes to the common bus, then all subsequent generators are allowed to use normal synchronizing methods.

There is room for improvement in systems of paralleling engine-generators on a common bus.

There is also room for improvement in methods of paralleling engine-generators on a common bus.

SUMMARY

These needs and others are met by embodiments of the disclosed concept, which provide relatively fast paralleling (e.g., within 10 seconds or less) of multiple engine-generator on a common bus.

By dynamically varying the excitation of the generator fields, multiple engine-generators can be pulled into synchronization electrically as they start up. Current through the engine-generator circuit breaker may be used as a feedback. By adjusting the excitation field of the generator during start-up, the engine-generators are believed to experience minimal mechanical and electrical stresses as they pull each other into synchronization and the current passed between the generators is limited.

In accordance with one aspect of the disclosed concept, a system of paralleling engine-generators on a common bus comprises: a plurality of engine-generators, each of the engine-generators including an output having an alternating current voltage; a plurality of circuit breakers, each of the circuit breakers being between the output of a corresponding one of the engine-generators and the common bus; a plurality of automatic voltage regulators, each of the automatic voltage regulators comprising a first mode in which field excitation for a corresponding one of the engine-generators is controllable and a second mode in which the alternating current voltage of the output of the engine-generators is automatically controlled; and a processor for the plurality of automatic voltage regulators, the processor being structured to start the engine-generators, close the circuit breakers, cause a plurality of the automatic voltage regulators to increase the field excitation for the corresponding one of the engine-generators in the first mode as long as less than a predetermined current flows through a corresponding one of the circuit breakers until the field excitation is equal to a rated voltage, and responsively cause a plurality of the automatic voltage regulators to automatically control the alternating current voltage of the output of the corresponding one of the engine-generators in the second mode, and, otherwise, to decrease the field excitation of the corresponding one of the engine-generators in the first mode.

The processor may be further structured to cause the engine-generators to be paralleled on the common bus with the field excitation being equal to the rated voltage and less than the predetermined current flowing through the circuit breakers within ten seconds of starting the engine-generators.

As another aspect of the disclosed concept, a method of paralleling engine-generators on a common bus comprises: employing a plurality of engine-generators, each of the engine-generators including an output having an alternating current voltage; employing a plurality of circuit breakers, each of the circuit breakers being between the output of a corresponding one of the engine-generators and the common bus; employing a plurality of automatic voltage regulators, each of the automatic voltage regulators comprising a first mode in which field excitation for a corresponding one of the engine-generators is controllable and a second mode in which the alternating current voltage of the output of the engine-generators is automatically controlled; starting the engine-generators; closing the circuit breakers; and causing a plurality of the automatic voltage regulators to increase the field excitation for the corresponding one of the engine-generators in the first mode as long as less than a predetermined current flows through a corresponding one of the circuit breakers until the field excitation is equal to a rated voltage, and responsively causing a plurality of the automatic voltage regulators to automatically control the alternating current voltage of the output of the corresponding one of the engine-generators in the second mode, and, otherwise, decreasing the field excitation of the corresponding one of the engine-generators in the first mode.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "processor" shall mean a programmable analog and/or digital device that can store, retrieve, and process data; a controller; a computer; a workstation; a personal computer; a microprocessor; a microcontroller; a microcomputer; a central processing unit; a mainframe computer; a mini-computer; a server; a networked processor; or any suitable processing device or apparatus.

As employed herein, the term "engine-generator" shall mean the combination of an electrical generator and a prime mover, such as an engine. This combination also means an engine-generator set or a gen-set. In many contexts, the engine is taken for granted and the combination is simply called a generator. Engine-generators may typically include, for example and without limitation, a fuel supply, a constant engine speed regulator (or governor), an automatic voltage regulator (AVR), cooling and exhaust systems, a lubrication system, and an automatic starting system.

As employed herein, the term "automatic voltage regulator" or AVR shall mean a device that provides suitably stable alternating current voltage regulation of a generator. For example, the AVR senses the output alternating current voltage of the generator and compares this value with a predetermined voltage reference. The AVR may constantly adjust the field excitation of the generator to compensate for variations in load and prime mover speed, and hold the output alternating current voltage to within predetermined limits (e.g., without limitation, corresponding to desired voltage magnitude, power factor and frequency values or ranges). The AVR processor or controller may take control of the AVR during the generator start-up sequence in order to control AVR output according to the disclosed concept.

The disclosed concept is described in association with systems and methods of paralleling two example engine-generators, although the disclosed concept is applicable to a wide range of systems and methods that can parallel three or more engine-generators. Although two engine-generator sets (gen-sets) are shown, three or more engine-generator sets can be employed.

Figure 1:
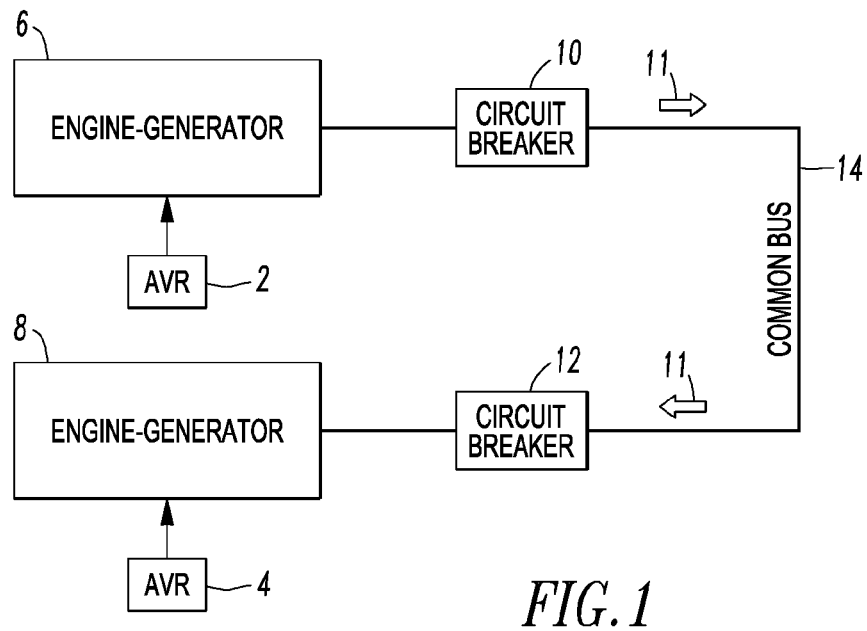
FIG. 1 is a block diagram of a power system including two parallel engine-generators and corresponding control.
Figure 2:
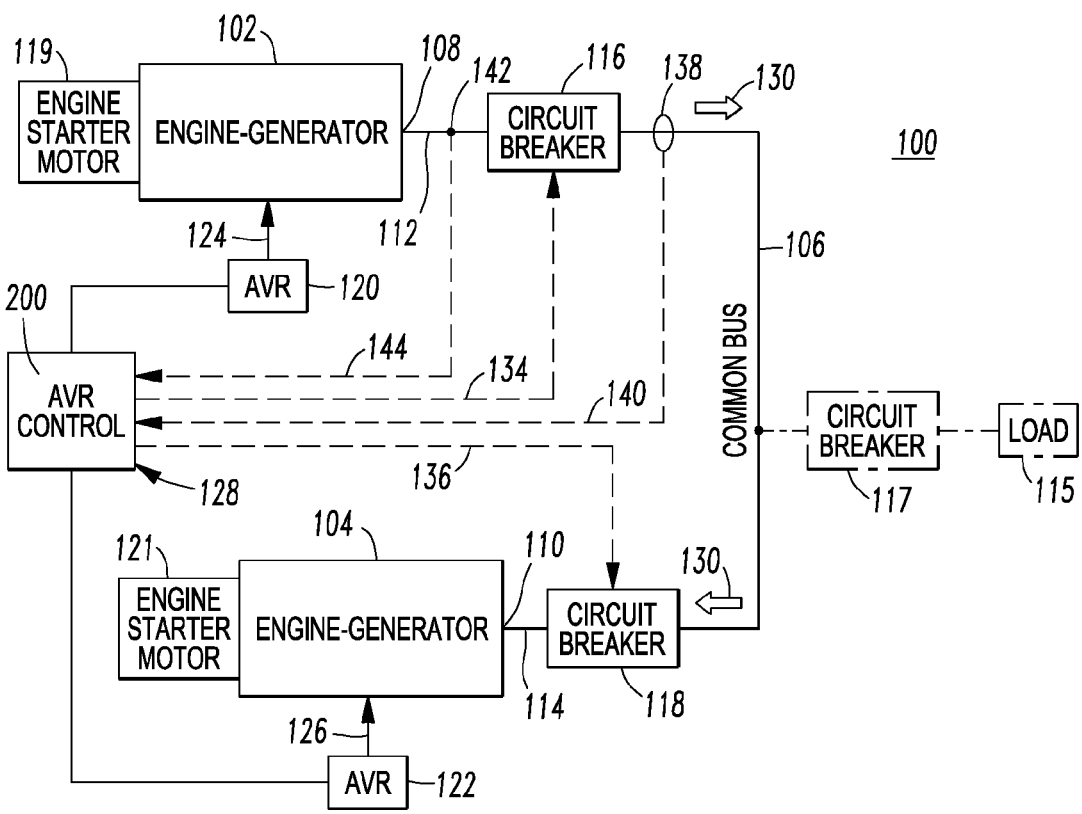
FIG. 2 is a block diagram of a power system including two parallel engine-generators and corresponding control in accordance with embodiments of the disclosed concept in which automatic voltage regulator field excitation is initially dynamically adjusted.

Referring to FIG. 2, a system 100 parallels two example engine-generators 102,104 on a common bus 106. Each of the engine-generators 102,104 includes an output 108,110 having an alternating current voltage 112,114, respectively. The system 100 also includes two example circuit breakers 116, 118, each of which is between the output 108,110 of a corresponding one of the engine-generators 102,104 and the common bus 106. The system 100 further includes two example AVRs 120,122. Each of the AVRs 120,122 includes a first mode (e.g., a manual mode) in which field excitation 124,126 for a corresponding one of the engine-generators 102,104 is controllable, and a second mode (e.g., an automatic mode) in which the alternating current voltage 112,114 of the output 108,110 of the respective engine-generators 102,104 is automatically controlled. For example, control of the field excitations 124,126 can be provided, for example and without limitation, by analog outputs of a controller 128 to the respective AVRs 120,122, which are operating in the first or manual mode.

It will be appreciated that if additional engine-generators (not shown) are added to the system 100, then each additional gen-set includes a corresponding circuit breaker (not shown) and a corresponding AVR (not shown).

The system 100 also includes a suitable processor, such as the example controller (AVR CONTROL) 128, for the two example AVRs 120,122. As will be described, below, in connection with FIG. 6, the controller 128 is structured to start the engine-generators 102,104, close the circuit breakers 116, 118, cause a plurality of the AVRs 120,122 to increase the field excitation 124,126 for the corresponding one of the engine-generators 102,104 in the first mode as long as less than a predetermined current flows through a corresponding one of the circuit breakers 116,118 until the field excitation 124,126 is equal to a rated voltage, and responsively cause a plurality of the AVRs 120,122 to automatically control the alternating current voltage 112,114 of the output 108,110 of the corresponding one of the engine-generators 102,104 in the second mode, and, otherwise, to decrease the field excitation 124,126 of the corresponding one of the engine-generators 102,104 in the first mode.

In this example, after the gen-sets 102,104 are closed to the common bus 106, the controller 128 begins to excite the generator field, starting at zero amperes. The field excitation 124,126 is carefully controlled. The feedback employed by the controller 128 for this control is the current 130 flowing between the engine-generators 102,104. The controller 128 adjusts each generator field excitation current to maintain a suitably low target value of the current 130 flowing through the gen-set circuit breakers 116,118. By adjusting AVR field excitation 124,126 to achieve a relatively low value of the current 130 flowing between the gen-sets 102,104, the circuit breakers 116,118 do not trip and mechanical stresses to the gen-sets 102,104 are limited.

Figure 3:
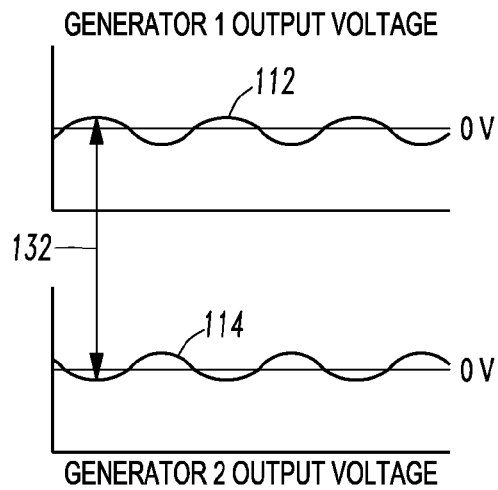
FIG. 3 is a plot of generator output voltage versus time for the two generators of FIG. 2 as the automatic voltage regulator field excitation is initially dynamically adjusted.

As shown in FIG. 3, even if the output voltage 112,114 of the gen-sets 102,104 (FIG. 2) is initially 180 degrees out of phase, the voltage difference 132 between the gen-sets 102, 104 is relatively small and corresponds to the initial relatively small AVR field excitation 124,126 (FIG. 2). This achieves an initial relatively low value of the current 130 flowing between the gen-sets 102,104, such that the gen-set circuit breakers 116,118 (FIG. 2) do not trip.

Figure 4:
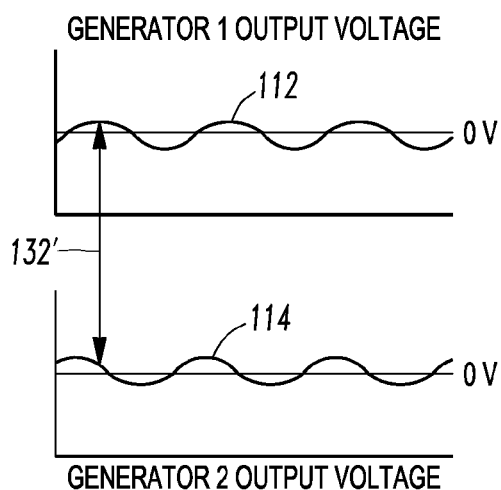
FIG. 4 is a plot of generator output voltage versus time for the two generators of FIG. 2 as the automatic voltage regulator field excitation is further dynamically adjusted.

Referring to FIG. 4, as the gen-sets 102,104 (FIG. 2) proceed through their example 5 to 7 second start sequence, the electro-magnetic forces exerted as a result of the current 130 (FIG. 2) flowing between the gen-sets 102,104 gently cause the gen-sets 102,104 to begin to pull each other toward synchronicity. As the gen-sets 102,104 come closer to synchronicity, the current 130 flowing between them falls. In response, the controller 128 (FIG. 2) increases the field excitation 124,126 (FIG. 2) to each generator in order to maintain a target current value through each gen-set circuit breaker 116,118 (FIG. 2). This causes the voltage difference 132' and the current 130 flowing between the gen-sets 102,104 to be reduced further. As this occurs, the controller 128 monitors the current 130 between the gen-sets 102,104. By dynamically adjusting the AVR field excitation 124,126, the gen-sets 102,104 can be pulled into synchronism as quickly as possible while minimizing stresses to the gen-sets 102,104 and preventing tripping of the circuit breakers 116,118.

Figure 5:
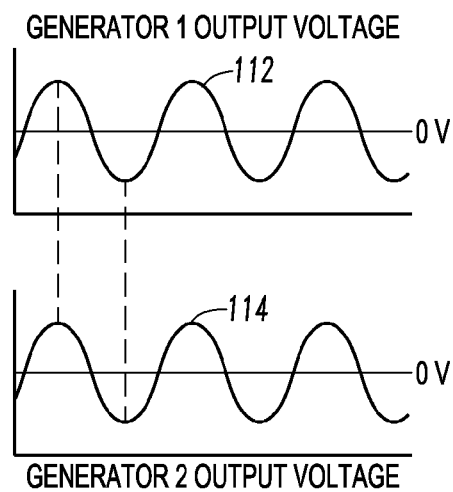
FIG. 5 is a plot of generator output voltage versus time for the two generators of FIG. 2 after the automatic voltage regulator field excitation provides synchronization of the engine-generators.

As shown in FIG. 5, the generators are fully synchronized, and the current 130 (FIG. 2) flowing between the gen-sets 102,104 (FIG. 2) is reduced to essentially zero. The controller 128 can now allow the AVRs 120,122 (FIG. 2) to excite the generator fields to their full rated value. The gen-sets 102,104 are synchronized and are in parallel on the common bus 106 (FIG. 2), the generator output voltages 112,114 are at their rated value, and the gen-sets 102,104 are ready to power a load, such as system equipment 115 (shown in phantom line drawing), through a load circuit breaker (CB) 117 (shown in phantom line drawing) from the common bus 106.

Referring again to FIG. 2, the disclosed concept preferably employs a generator automatic voltage regulator (AVR) 120, 122 that allows complete control of the generator field through, for example and without limitation, a voltage bias signal, from 0 to 100% field excitation as set by the controller 128. The AVR can be, for example and without limitation, a Basler DECS-100, which allows both manual and automatic control, marketed by Basler Electric Company of Highland, Ill. The starting condition is the gen-sets 102,104 shutdown and the generator circuit breakers 116,118 closed. For example and without limitation, the maximum output current of the gen-sets 102,104 is 1500 amps, and the gen-set circuit breakers 116,118 do not trip below this value. A start command is received by all gen-sets 102,104, and all engines start to crank simultaneously. At crank terminate (e.g., when the engine starter motors 119,121 are disengaged), the disclosed concept starts gradually, through the voltage bias, exciting the generator fields. The feedback is the current 130 through each gen-set circuit breaker 116,118. The value of this current 130 between the gen-sets 102,104 depends on how far out of phase the gen-sets are and the magnitude of the generator field excitation 124,126. This current 130 flowing between the gen-sets 102,104 creates magnetic fields that draw the gen-sets 102,104 into synchronicity. The disclosed concept monitors this current 130 and adjusts the field excitation 124,126 in order that the current 130 through the individual generator circuit breakers 116,118 never exceeds, for example and without limitation, 600 amperes, although the actual value depends on the example gen-set output current capacity. The generator circuit breakers 116,118 never trip, because they never approach the trip threshold. Because the current 130 between the gen-sets 102,104 is limited, the mechanical stresses on the engine and the generator are minimized. As the engines ramp up to rated speed, they are "gently" drawn into parallel. At 60 Hertz, the generator field excitation 124,126 is at rated value for the desired generator voltage output 112, 114, the generators are at, for example and without limitation, 60 Hertz (e.g., without limitation, 50 Hertz for other parts of the world), and all generators are in parallel in less than, for example and without limitation, 10 seconds.

The controller 128 can be, for example and without limitation, an EMCP 3.S dedicated controller marketed by Caterpillar Inc. of Peoria, Ill. The controller 128 can include an analog output controlled by an AVR control routine 200 (FIGS. 2 and 6) that controls the field excitation 124 or 126 in the first mode of the AVR 120,122. Also, a contact closure (not shown) from the controller 128 to the AVR 120 or 122 switches the AVR from the first mode (manual control) to the second mode (automatic control).

Figure 6:
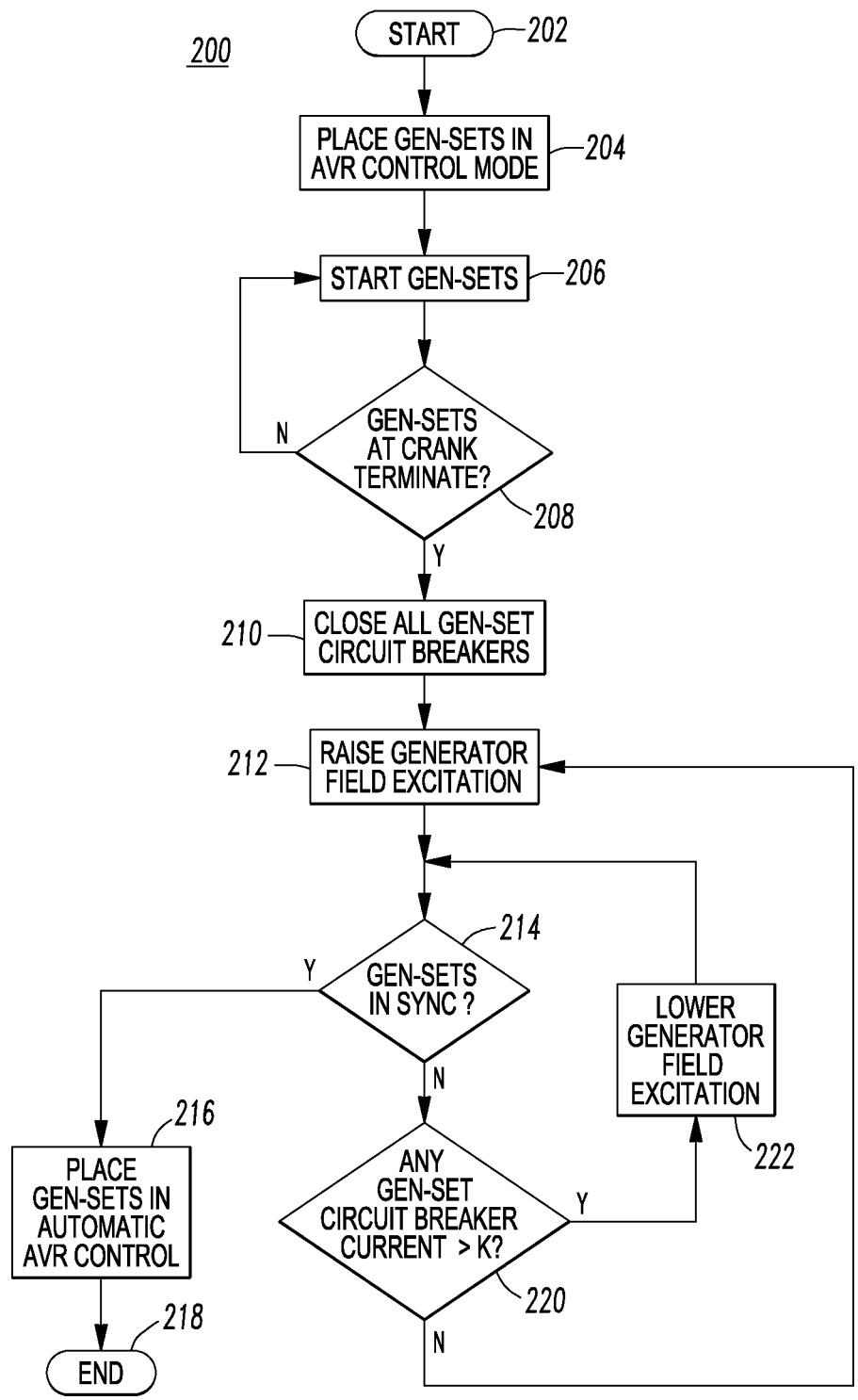
FIG. 6 is a flowchart of the routine of the automatic voltage regulator processor of FIG. 2.

Referring to FIGS. 2 and 6, the routine 200 starts at 202 and places the gen-sets 102,104 in AVR control mode, which is the first or manual mode, at 204. Next, at 206, the gen-sets 102,104 are started (e.g., by sending a start command to their engines). Then, at 208, it is determined if the gen-sets 102,104 are at crank terminate. The example crank terminate (or when the starter motors 119,121 disengage) is chosen as the point where the gen-set circuit breakers 116,118 are closed at 210, although the actual gen-set circuit breaker close point may vary. In this example, if the gen-sets 102,104 are not at crank terminate, then step 206 is repeated to maintain the start command. Otherwise, if the gen-sets 102,104 are at crank terminate, then the gen-set circuit breakers 116,118 are closed at 210. Next, at 212, the generator field excitation is raised (e.g., without limitation, starting at 0 amperes in increments of 0.1 amperes; any suitable value). Then, at 214, it is determined if the gen-sets 102,104 are in sync by determining if the current 130 is less than a predetermined amount (e.g., without limitation, a maximum acceptable current as determined by rated generator output in KVA and rated generator voltage); a relatively small positive current) and if the gen-set excitation fields 124,126 are excited to full rated voltage. If so, then at 216, the gen-sets 102,104 are placed in automatic AVR control mode, which is the second or automatic mode, before the routine 200 ends at 218. Otherwise, if the gen-sets 102,104 are not in sync, then at 220, it is determined if any gen-set circuit breaker current is greater than a predetermined value (K) (e.g., without limitation, 600 A; any suitable current value). If so, then at 222, the generator field excitation is lowered (e.g., without limitation, in decrements of 0.1 amperes; any suitable value) before step 214 is repeated. Otherwise, if the gen-set circuit breaker current 130 is less than or equal to the predetermined value (K), then step 212 is repeated.

As shown in FIG. 2, conventional circuit breaker control 134,136 (e.g., open; close) of the circuit breakers 116,118 is provided by the controller 128. Also, as shown with the gen-set 102 and the circuit breaker 116, a current sensor 138 senses gen-set current via a connection 140 to the controller 128, and a voltage sensor 142 senses gen-set voltage via a connection 144 to the controller 128.

For the phase angle difference, because the gen-set circuit breakers 116,118 are closed, there is no known practical way of measuring the phase angle difference between the gen-sets 102,104. However, the current 130 flowing through the gen-set circuit breakers 116,118 indicates that a phase angle difference exists. The magnitude of the current flow, as compared to the present excitation current, provides a relative measurement of how far out of phase the gen-sets 102,104 are. The gen-sets 102,104 are deemed to be "in phase" when the gen-set output voltage 112,114 is at full rated value and the current 130 between the gen-sets 102,104 is minimal or zero.

The disclosed concept mitigates the disadvantages associated with dead field paralleling, and gently pulls multiple gen-sets into parallel in less than 10 seconds. As a result, multiple gen-sets are quickly paralleled to a common bus with no risk of generator circuit breakers tripping and with limited mechanical stresses exerted on the engines and generators.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A system of paralleling engine-generators on a common bus, said system comprising:
    a plurality of engine-generators, each of said engine-generators including an output having an alternating current voltage;
    a plurality of circuit breakers, each of said circuit breakers being between the output of a corresponding one of said engine-generators and said common bus;
    a plurality of automatic voltage regulators, each of said automatic voltage regulators comprising a first mode in which field excitation for a corresponding one of said engine-generators is controllable and a second mode in which the alternating current voltage of the output of said engine-generators is automatically controlled; and
    a processor for said plurality of automatic voltage regulators, said processor being structured to start the engine-generators, close said circuit breakers, cause a plurality of said automatic voltage regulators to increase the field excitation for the corresponding one of said engine-generators in the first mode as long as less than a predetermined current flows through a corresponding one of said circuit breakers until the field excitation brings outputs of said engine-generators to a rated voltage, and responsively cause a plurality of said automatic voltage regulators to automatically control the alternating current voltage of the output of the corresponding one of said engine-generators in the second mode, and, otherwise, to decrease the field excitation of the corresponding one of said engine-generators in the first mode.

2. The system of claim 1 wherein said processor is further structured to initially cause each of said automatic voltage regulators to be in the first mode.

3. The system of claim 1 wherein said processor is further structured to cause said engine-generators to be paralleled on said common bus with the field excitation bringing outputs of said engine-generators to the rated voltage and less than the predetermined current flowing through said circuit breakers within ten seconds of starting said engine-generators.

4. The system of claim 1 wherein said common bus is structured to be connected to a circuit breaker for a load powered by said common bus.

5. The system of claim 1 wherein the predetermined current is 600 A; and wherein said engine-generators have a maximum output current of 1500 A.

6. The system of claim 1 wherein said processor is further structured to close the corresponding one of said circuit breakers responsive to disengagement of a starter motor for the corresponding one of said engine-generators.

7. The system of claim 1 wherein said processor comprises for each of said engine-generators a current sensor structured to sense current flowing through the corresponding one of said circuit breakers and a voltage sensor structured to sense the alternating current voltage of the output of the corresponding one of said engine-generators.

8. The system of claim 1 wherein the predetermined current is about 40% of a maximum output current of said engine-generators.

9. The system of claim 1 wherein said processor is further structured to cause synchronism of said engine-generators when the field excitation brings output of said engine-generators to the rated voltage and less than the predetermined current flows through said circuit breakers.

10. The system of claim 1 wherein said first mode is structured to control the field excitation of the corresponding one of said engine-generators through a voltage bias signal ranging from 0% to 100% of rated field excitation.

11. A method of paralleling engine-generators on a common bus, said method comprising:
    employing a plurality of engine-generators, each of said engine-generators including an output having an alternating current voltage;
    employing a plurality of circuit breakers, each of said circuit breakers being between the output of a corresponding one of said engine-generators and said common bus;
    employing a plurality of automatic voltage regulators, each of said automatic voltage regulators comprising a first mode in which field excitation for a corresponding one of said engine-generators is controllable and a second mode in which the alternating current voltage of the output of said engine-generators is automatically controlled;
    starting the engine-generators;
    closing said circuit breakers; and
    causing a plurality of said automatic voltage regulators to increase the field excitation for the corresponding one of said engine-generators in the first mode as long as less than a predetermined current flows through a corresponding one of said circuit breakers until the field excitation brings outputs of said engine-generators to a rated voltage, and responsively causing a plurality of said automatic voltage regulators to automatically control the alternating current voltage of the output of the corresponding one of said engine-generators in the second mode, and, otherwise, decreasing the field excitation of the corresponding one of said engine-generators in the first mode.

12. The method of claim 11 further comprising:
    initially causing each of said automatic voltage regulators to be in the first mode.

13. The method of claim 11 further comprising:
    causing said engine-generators to be paralleled on said common bus with the field excitation bringing outputs of said engine-generators to the rated voltage and less than the predetermined current flowing through said circuit breakers within ten seconds of starting said engine-generators.

14. The method of claim 11 further comprising:
connecting said common bus to a circuit breaker for a load powered by said common bus.

15. The method of claim 11 further comprising:
employing the predetermined current of 600 A; and
employing a maximum output current of 1500 A of said engine-generators.

16. The method of claim 11 further comprising:
closing the corresponding one of said circuit breakers responsive to disengagement of a starter motor for the corresponding one of said engine-generators.

17. The method of claim 11 further comprising:
employing for each of said engine-generators a current sensor structured to sense current flowing through the corresponding one of said circuit breakers and a voltage sensor structured to sense the alternating current voltage of the output of the corresponding one of said engine-generators.

18. The method of claim 11 further comprising:
employing the predetermined current of about 40% of a maximum output current of said engine-generators.

19. The method of claim 11 further comprising:
causing synchronism of said engine-generators when the field excitation brings outputs of said engine-generators to the rated voltage and less than the predetermined current flows through said circuit breakers.

20. The method of claim 11 further comprising:
controlling the field excitation of the corresponding one of said engine-generators through a voltage bias signal ranging from 0% to 100% of rated field excitation.

* * * * *